United States Patent [19]

Kretschmer et al.

[11] Patent Number: 5,366,043
[45] Date of Patent: Nov. 22, 1994

[54] LUBRICATING DEVICE FOR TWO PLUNGING PROFILES SLIDABLE INSIDE ONE ANOTHER, ESPECIALLY OF A PROPELLER SHAFT

[75] Inventors: Horst Kretschmer, Cologne; Hans-Jürgen Langen, Frechen, both of Germany

[73] Assignee: GKN Walterscheid GmbH, Lohmar, Germany

[21] Appl. No.: 146,749

[22] Filed: Nov. 3, 1993

[30] Foreign Application Priority Data

Nov. 4, 1992 [DE] Germany .............................. 4237176

[51] Int. Cl.⁵ ...................... F16C 17/00; F16C 21/00; F16C 1/24
[52] U.S. Cl. ........................................ 184/5; 184/100; 184/105.3; 464/7; 464/162
[58] Field of Search .................. 184/5, 100, 105.3; 464/7, 16, 162

[56] References Cited

U.S. PATENT DOCUMENTS

| | | | |
|---|---|---|---|
| 3,105,370 | 10/1963 | Weasler | 464/7 |
| 3,456,760 | 7/1969 | Musse et al. | 464/7 |
| 4,308,729 | 1/1982 | Condon | 464/162 |
| 5,299,982 | 4/1994 | Burton | 464/162 |

FOREIGN PATENT DOCUMENTS

| | | | |
|---|---|---|---|
| 0497535 | 12/1988 | United Kingdom | 464/7 |
| 1571355 | 6/1990 | U.S.S.R. | 184/105.3 |

*Primary Examiner*—Thomas E. Denion
*Attorney, Agent, or Firm*—Harness, Dickey & Pierce

[57] ABSTRACT

A lubricating device for a propeller shaft with two tubular plunging profiles (2, 4) inserted into one another. The lubricating device has two formed parts (16, 21) and a connecting hose between the two. The first formed part (16) is arranged towards the inner end (12) of the inner plunging profile (4). The first formed part has a through-bore (17) which ends in apertures (14, 15) opening towards the region of transition between the plunging profiles (2, 4). The first formed part further includes a connecting sleeve (18) with a lubricating channel (19). The second formed part (21) is arranged in the region of the other end of the inner plunging profile (4). It is secured inside the inner plunging profile (4). The second formed part has a continuous lubricating channel (23) extending through a connecting sleeve (22). A lubricating nipple (24) is threaded into the other end of the lubricating channel (23). The two formed parts are connected by the hose (27) slid over the connecting sleeves (18, 22). The parts of the two plunging profiles (2, 4) slide on one another and are lubricated by pressing lubricant through the lubricating nipple (24).

10 Claims, 3 Drawing Sheets

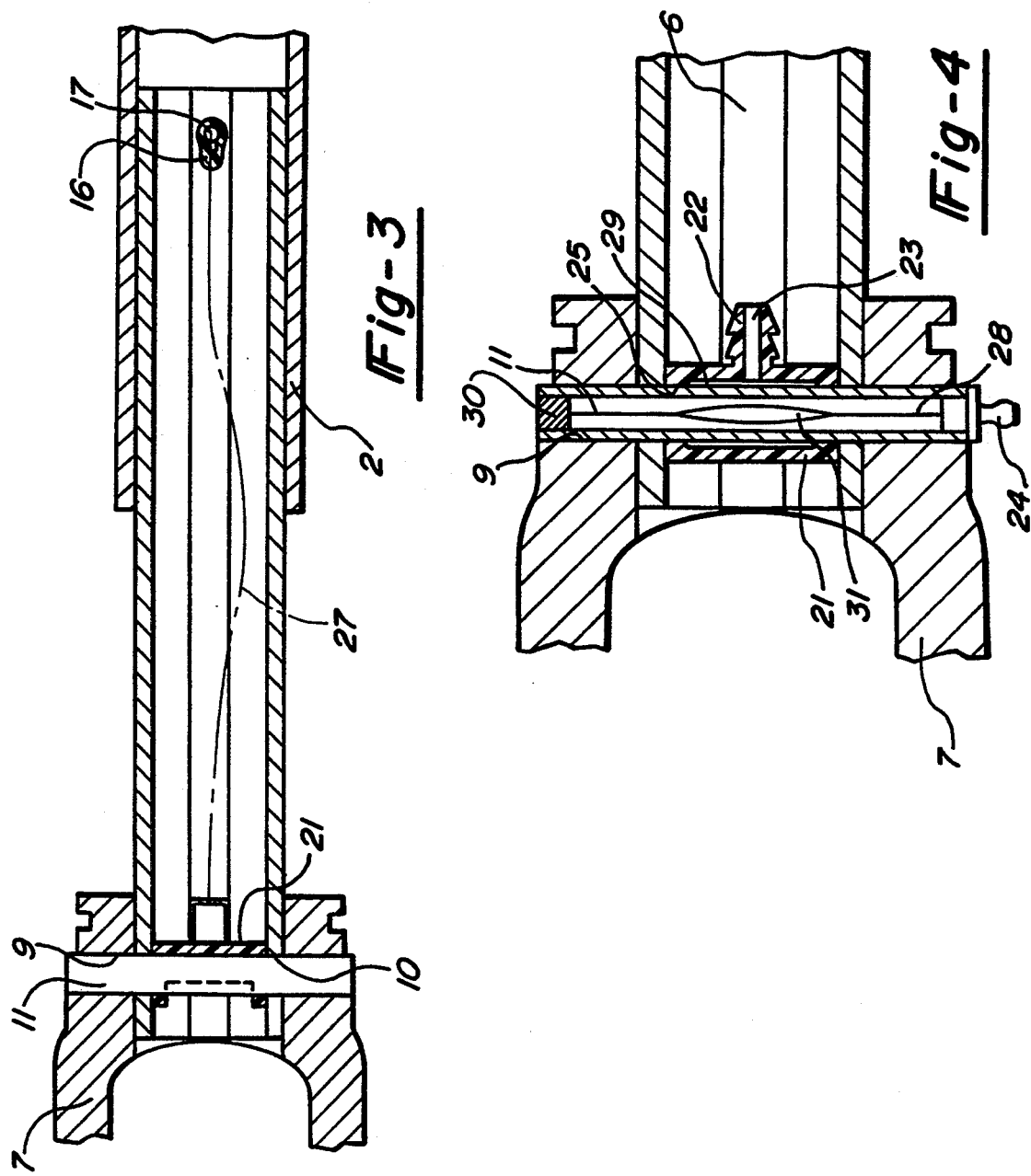

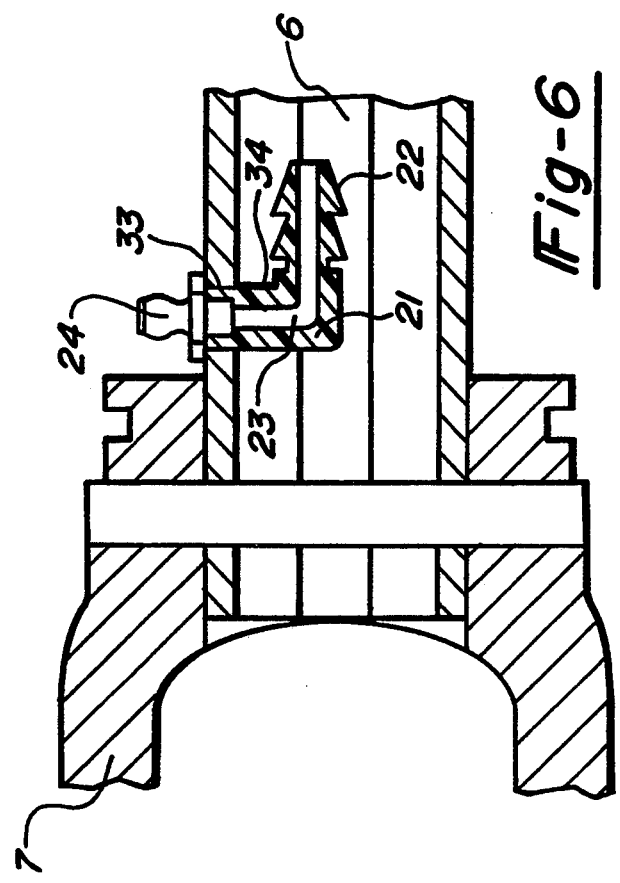
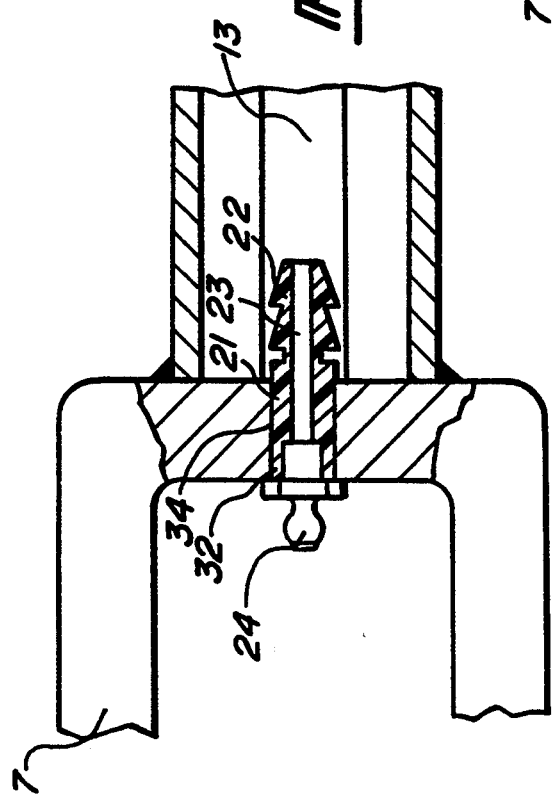

LUBRICATING DEVICE FOR TWO PLUNGING PROFILES SLIDABLE INSIDE ONE ANOTHER, ESPECIALLY OF A PROPELLER SHAFT

BACKGROUND OF THE INVENTION

The invention relates to a lubricating device for two tubular plunging profiles slidably arranged inside one another, especially of a propeller shaft.

In the case of propeller shafts with plunging profiles, such as those used in the agricultural industry, the profiles cannot be lubricated unless they are pulled apart to permit the overlapping regions to be greased. This is a complicated and expensive operation, and since agricultural machinery equipped with such propeller shafts, with such plunging profiles, is ordinarily used only on a seasonal basis, lubrication is easily forgotten.

There is a further problem in that such plunging profiles designed to be replaceable are supplied in predetermined lengths and are cut to the required length in the process of replacing them. The length depends on the implement to be attached. The farmer is used to preparing the components provided with a lubricating nipple, e.g. the set of universal joints, by relubricating them.

SUMMARY OF THE INVENTION

It is an object of the invention to provide a lubricating device for tubular plunging profiles, especially used in agricultural propeller shafts, which is of a simple design. Also, even without an in-depth knowledge of the lubricating device, it may subsequently or when replacing plunging parts of the propeller shaft be associated with the plunging profiles. The lubricating device permits re-lubrication of the plunging profiles in respect of the profile parts sliding on one another without the propeller shaft having to be dismantled.

In accordance with the invention, at the end of the inner tubular plunging profile slid into the outer plunging profile, a formed part is inserted which is provided with a through-bore which extends transversely to the longitudinal axis of the plunging profiles and which opens towards the inner face of the outer plunging profile. The formed part includes a connecting sleeve with a channel which opens towards the through-bore. A further formed part, including a connecting sleeve with a continuous lubricating channel, is introduced into the other end of the inner plunging profile. A lubricating nipple is provided which is accessible from the outside and which is connected to the lubricating channel of the further formed part to pass on the lubricant. The two formed parts are connected by a hose whose ends are slid on to the connecting sleeves.

An advantage of this design is the connecting hose enables the lubricating device to be easily adapted to different plunging profile lengths. Furthermore, it is easily integrated into an existing propeller shaft because only two bores in the inner plunging profile are required to attach the first formed part.

The lubricating nipple may be arranged in the region of the joint which is close to the lubricating nipple, which is provided for lubricating the set of universal Joints. In consequence, the user, when lubricating the universal joints, is reminded that the plunging profiles have to be lubricated as well. Lubrication is effected by means of the lubricating nipple of the second formed part. The two propeller shaft halves do not have to be pulled apart during the lubricating operation. A further substantial advantage is the lubricating elements are protected inside the plunging parts.

According to one embodiment of the invention, the first formed part is positioned, so as to be sealed, in two diametrically opposed apertures of the inner plunging profile. It is sufficient for the first formed part to he pressed in with pretension so that its ends firmly rest against the inner contour of the bore and apertures of the inner plunging profile.

The second formed part is secured by a recess in the part, with a pin extending transversely to the inner plunging profile and guided through the recess. For securing the second formed part, it is possible to use the already existing tensioning pin required to secure the inner plunging profile in the bore of the joint yoke. By means of this connection it is possible to apply the counter force required for operating the lubricating nipple.

According to a further embodiment, the pin includes an axial bore which opens towards an annular groove in the recess of the second formed part. The annular groove communicates with the lubricating channel in the connecting sleeve. The lubricating nipple is connected to the bore of the pin to pass on the lubricant.

However, it is also possible for the pin to be designed as a slotted tensioning sleeve, with the lubricating nipple being inserted into one end thereof and the other end being closed by a plug. Furthermore, the tensioning sleeve includes an aperture which opens towards the annular groove.

In a further embodiment, the second formed part includes a tubular portion which is extended by the connecting sleeve. The end of the tubular portion facing away from the connecting sleeve carries the lubricating nipple and the formed piece is inserted into an axial aperture of a connecting part connected to the inner plunging profile. The second formed part, at least with its connecting sleeve, projects into the hollow space of the first plunging profile.

According to yet a further embodiment of the invention, the wall of the inner plunging profile includes an aperture into which the second formed part is inserted and through which it projects into the hollow space of the inner plunging profile. The second formed part includes a tubular portion to which the connecting sleeve is attached so as to be articulated. The other end of the tubular portion includes the lubricating nipple. To seal the interior of the two plunging profiles, the second formed part may be adapted to, and fill, the internal cross-section of the inner plunging profile.

Preferably, both formed parts are provided in the form of plastic parts produced by injection molding.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawing wherein:

FIG. 3 is a further longitudinal section view through a plane containing the axis of the pin connecting the joint yokes and the plunging profiles.

FIG. 4 is a cross section view of part of the inner plunging profile including a joint yoke and a further embodiment for the second formed part.

FIG. 5 is a partial cross section view of part of an inner plunging profile including a joint yoke attached thereto of a third embodiment for the second formed part, the latter being inserted into the joint yoke.

FIG. 6 is a cross section view of a fourth embodiment of the second formed part including the second formed part inserted through an aperture in the wall of the inner plunging profile.

DETAILED DESCRIPTION OF THE PREFERRED EMBODIMENTS

Figure 1:
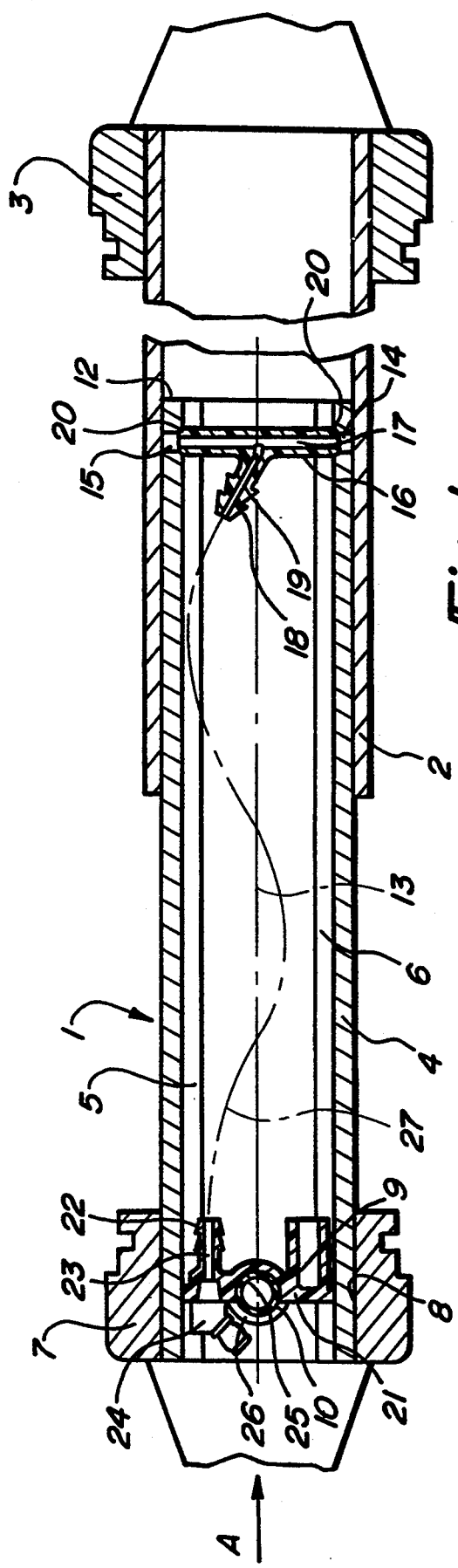
FIG. 1 is a longitudinal section view through part of a propeller shaft, the section extends between the two yoke arms of joint yokes associated with the plunging profiles.
Figure 2:
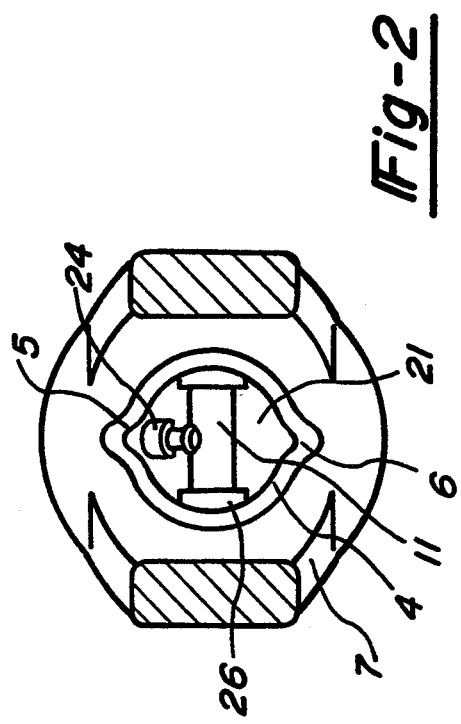
FIG. 2 is a side plan view of FIG. 1 in the direction of arrow A.

In the case of the embodiments according to FIGS. 1 to 3, only part of the propeller shaft 1 is shown.

The outer tubular plunging profile 2, at one end, carries a joint yoke 3. The joint yoke 3 forms part of a universal joint not illustrated in greater detail. The outer plunging profile 2 is non-rotatingly and axially immovably connected to the associated joint yoke 3.

An inner plunging profile 4 is inserted inside the outer plunging profile 2 from the end facing away from the joint yoke 3. The inner plunging profile 4 is also tubular and, as can be seen particularly clearly in FIG. 2, it comprises two diametrically opposed formations 5, 6. Apart from such a 2-rib profile, there is also known a profile with 3 ribs. The outer plunging profile 2 is designed accordingly, so that a non-rotating connection is achieved between the outer plunging profile 2 and the inner plunging profile 4. The two plunging profiles 2, 4 inserted into one another permit a change in length in that, to a greater or lesser extent, they can be inserted into or extracted from one another. The end of the inner plunging profile 4, inserted into the outer plunging profile 2, has been given the reference number 12. A joint yoke 7, by means of its bore 8, is positioned on the end of the inner plunging profile projecting from the outer plunging profile 2. The formations 5, 6 ensure a non-rotating connection between the joint yoke 7 and the inner plunging profile 4.

The joint yoke 7 includes a transverse bore 9 and the inner plunging profile 4 is provided with a matching transverse bore 10, with a pin 11 passing through both bores. The pin 11 is provided in the form of a slotted tensioning sleeve. The pin 11 ensures an axially firm connection between the joint yoke 7 and the inner plunging profile 4.

The longitudinal axis of the two plunging profiles 2, 4 inserted into one another has been given the reference number 13. The axis 13 also constitutes the rotational axis around which there is transmitted torque when torque is applied via one of the joint yokes 3, 7. The two joint yokes 3, 7 form part of universal joints whose cross member (not illustrated) and joint yoke serve to be connected to a driving or driven machine part. For example, one joint may be connected to the power take-off shaft of a tractor and the other joint to the driving journal of the agricultural implement to be driven. In addition, the propeller shaft 1 is normally also provided with a guard which covers the two plunging profiles 2, 4 by tubes inserted into one another, which is supported on the joint yokes 3, 7 and covers the joints by means of protective funnels. As a result, lubrication of the plunging profiles 2, 4 is greatly obstructed.

Towards the end 12 of the inner plunging profile 4 inserted into the outer plunging profile 2, two apertures 14, 15 are provided which break through the wall of the inner plunging profile 4 in the region of the formations 5, 6 and are positioned diametrically opposite one another. They may be cylindrical bores. The bores 14, 15 open towards the inner face of the outer plunging profile 2. The bores end in the region of transition between the outer plunging profile 2 and the inner plunging profile 4 where a relative adjustment takes place in the direction of the longitudinal axis 13. This means that the grease can be guided directly to the load-bearing, wear-endangered flanks. Such adjustments in length result from the change in the relative position of the two joints (not illustrated) and thus the joint yokes 3, 7 relative to one another. Furthermore, they may result from a change in articulation of the connected joints, for instance when a curve is negotiated by the unit consisting of the tractor and the implement connected and to he driven.

The first formed part 16, which is tubular and includes a through-bore 17, is inserted from the end 12. The through-bore 17 ends in the two apertures 14, 15. Furthermore, a connecting sleeve 18 is provided and includes a continuous channel 19 which ends in the through-bore 17. The outer face of the connecting sleeve 18 is provided with continuous projections whose cross-section is sawtooth-like. The ends of the substantially tubular first formed part 16 include conical faces 20 by means of which they sealingly rest in the apertures 14, 15. in this region it is possible to achieve pretension by giving the length of the tubular base member of the first formed part 16 a suitable dimension.

A further formed part 21 is inserted from the free end into the hollow space of the inner plunging profile 4 towards the joint yoke 7. As is particularly obvious from FIG. 2, the formed part 21 is provided with a contour which matches the inner contour of the inner plunging profile 4. In consequence, the formed part 21 seals the hollow space of the plunging profiles 2, 4 towards the outside and prevents the penetration of dust, dirt, humidity and the like. The second formed part 21 includes a connecting sleeve 22 which extends parallel to the longitudinal axis 13 and whose outer face is also provided with projections whose cross-section is sawtooth-like. They are annular projections. The second formed part 21 also includes a lubricating channel 23 starting from the end positioned opposite the end of the connecting sleeve 22. The lubricating channel 23 extends through the connecting sleeve 22. A lubricating nipple 24 is threaded into the lubricating channel 23.

Furthermore, the second formed part 21 includes a recess 25 which extends transversely to the longitudinal axis 13 and which form-fittingly embraces the pin 11 for connecting the joint yoke 7 to the inner plunging profile 4. Furthermore, eyes 26, which fully enclose the tensioning pin 11, are formed onto the formed part 21 towards the formations 5, 6. The tensioning pin 11 is guided through the eyes 26, as a result of which the second formed part 21 is secured in the hollow space of the inner plunging profile 4 so that even if there is provided a grease press, a sufficiently high holding force is generated. The second formed part 21 cannot be displaced when the connecting head of the grease press is attached to the lubricating nipple 24. The two ends of a hose 27 are slid over the two connecting sleeves 18, 22 of the two formed parts 16, 21. The hose provides a connection between the lubricating nipple 24 and the through-bore 17 which opens towards the apertures 14, 15. When grease is pressed through the lubricating nipple 24, it passes through the lubricating channel 23 and reaches the cross-section of the hose 27. From here it moves into the channel 19 and the through-bore 17 of the first formed part 16. From here it passes through the apertures 14, 15 into the sliding region between the two plunging profiles 2, 4.

FIG. 4 illustrates a position of the second formed part 21. Design and position of the first formed part 16 and the associated hose 27 correspond to those shown in the embodiments according to FIGS. 1 to 3. In the embodiment according to FIG. 4 a pin 11 is provided in the form of a slotted tensioning sleeve which is inserted into the bore 9 of the joint yoke 7 and passes through the bore 10 of the inner plunging profile 4. The one end of the pin is sealed by a plug 30. A lubricating nipple 24 which, for lubrication purposes, projects outwardly beyond the contour of the joint yoke 7 is inserted into the other end of the pin. The pin 11 passes through the recess 25 of the enclosing second formed part 21. The recess 25 is provided with an annular groove 29 which is connected to the lubricating channel 23 of the transversely projecting connecting sleeve 22. The wall of the pin 11 designed as a slotted tensioning sleeve is provided with an aperture 31 which ends in the annular groove 29 and via which the lubricant emerging from the lubricating nipple is able to reach the lubricating channel 23 of the connecting sleeve 22.

In the case of the embodiment according to FIG. 5, a joint yoke is directly secured to the inner plunging profile 4 by welding. The part of the joint yoke 7 covering the end face of the inner tubular plunging profile 4 is arranged in the direction of the longitudinal axis 13 of the two plunging profiles 2, 4. The aperture has been given the reference number 32.

The second formed part 21 includes a tubular portion 34 and the connecting sleeve 22 arranged to extend from the tubular portion 34. The lubricating nipple 24 is connected at the end of the tubular portion 34 facing away from the connecting sleeve 22. The lubricating channel 23 of the connecting sleeve 22 also extends through the tubular portion 34 towards the lubricating nipple 24. The formed part 21 is introduced from the outside into the aperture 32 in such a way that the lubricating nipple 24, by means of a collar, is axially supported on a contact face of the joint yoke 7. The connecting sleeve 22 projects into the hollow space of the inner plunging profile 4 for the purpose of connecting the hose.

In the embodiment according to FIG. 6, the wall of the inner plunging profile 6 is provided with an aperture 33 through which the formed part 21 is inserted. The formed part 21 includes a tubular portion 34 and the connecting sleeve 22 attached thereto at a right angle. The lubricating channel 23 extends through the connecting sleeve 22 and the tubular portion 34. The lubricating nipple 24 is connected at the end of the formed part 21 projecting from the inner plunging profile 4. The lubricating nipple 24, the tubular portion 34 and the connecting sleeve 22 may be produced in one piece, for example in the form of a plastic molding.

The hose for supplying the first formed part with lubricant is connected as described with reference to the embodiments shown in FIGS. 1 to 3.

While the above detailed description describes the preferred embodiment of the present invention, the invention is susceptible to modification, variation, and alteration without deviating from the scope and fair meaning of the subjoined claims.

We claim:

1. A lubricating device for two tubular plunging profiles slidably arranged inside one another, especially for a propeller shaft, comprising:
   one end of an inner tubular plunging profile is slid into an outer plunging profile, a formed part is inserted in one end, the said formed part is provided with a through-bore which extends transversely to a longitudinal axis of the plunging profiles and which opens towards an inner face of the outer plunging profile, said formed part including a connecting sleeve with a channel which opens towards the through-bore, a further formed part including a connecting sleeve with a continuous lubricating channel is introduced into the other end of the inner plunging profile;
   a lubricating nipple is coupled with said further formed part, said nipple is accessible from the outside and connected to the lubricating channel of the further formed part for passing on lubricant;
   and a hose connecting the two formed parts, ends of said hose are slid onto the connecting sleeves.

2. A lubricating device according to claim 1, wherein the first formed part is positioned, so as to be sealed, in two diametrically opposed apertures of the inner plunging profile.

3. A lubricating device according to claim 2, wherein the ends of the first formed part are supported, under pretension, in the apertures.

4. A lubricating device according to claim 1, wherein the further formed part includes a recess which holds a pin guided transversely through the inner plunging profile for axially holding the further formed part.

5. A lubricating device according to claim 4, wherein the pin includes an axial bore which opens towards an annular groove in the recess of the further formed part and communicates with the lubricating channel in the connecting sleeve and that the lubricating nipple is connected to the bore.

6. A lubricating device according to claim 5, wherein the pin is designed as a slotted tensioning sleeve, with the lubricating nipple being inserted into one end thereof and the other end being closed by a plug, said slotted tensioning sleeve including an aperture which opens towards the annular groove.

7. A lubricating device according to claim 1, wherein said further formed part includes a tubular portion which is extended by the connecting sleeve that the end of the tubular portion facing away from the connecting sleeve carries the lubricating nipple and said further formed part is inserted into an axial aperture of a connecting part connected to the inner plunging profile and projects into the hollow space of the inner plunging profile.

8. A lubricating device according to claim 1, wherein a wall of the inner plunging profile includes an aperture into which the further formed part is inserted and through which it projects into a hollow space of the inner plunging profile, said further formed part includes a tubular portion to which the connecting sleeve is attached so as to be articulated and that the other end of the tubular portion includes the lubricating nipple.

9. A lubricating device according to claim 1, wherein said further formed part fills, and seals towards the outside, the internal cross-section of the inner plunging profile.

10. A lubricating device according to claim 1, wherein the two formed parts are molded plastic parts.

* * * * *

UNITED STATES PATENT AND TRADEMARK OFFICE
CERTIFICATE OF CORRECTION

PATENT NO. : 5,366,043
DATED : November 22, 1994
INVENTOR(S) : Horst Kretschmer and Hans-Jürgen Langen It is certified that error appears in the above-indentified patent and that said Letters Patent is hereby corrected as shown below:

Column 1, line 63, "Joints" should be --joints--

Column 3, line 41, after "inner plunging profile", please insert --4--

Column 4, line 31, "in" should be --In--

Column 6, line 5, Claim 1, please delete "especially"

Signed and Sealed this

Eleventh Day of July, 1995

Attest:

BRUCE LEHMAN

Attesting Officer

Commissioner of Patents and Trademarks